US006203054B1

(12) United States Patent
Matsumoto

(10) Patent No.: US 6,203,054 B1
(45) Date of Patent: Mar. 20, 2001

(54) SUSPENSION FOR STROLLER

(75) Inventor: Tamotsu Matsumoto, Chiba (JP)

(73) Assignee: Form Design Corporation, Chiba (JP)

(*) Notice: Subject to any disclaimer, the term of this patent is extended or adjusted under 35 U.S.C. 154(b) by 0 days.

(21) Appl. No.: 09/319,934

(22) PCT Filed: Dec. 19, 1996

(86) PCT No.: PCT/JP96/03711

§ 371 Date: Jun. 18, 1999

§ 102(e) Date: Jun. 18, 1999

(87) PCT Pub. No.: WO98/26971

PCT Pub. Date: Jun. 25, 1998

(51) Int. Cl.⁷ ............................................ B62B 11/00
(52) U.S. Cl. ................... 280/647; 280/650; 280/657; 280/47.38
(58) Field of Search .......................... 280/642, 643, 280/644, 647, 649, 650, 42, 657, 658, 43.1, 47.34, 47.35, 47.36, 47.371, 47.38, 47.39, 47.4; 16/35 D, 42 T, 30, 44

(56) References Cited

U.S. PATENT DOCUMENTS

| 3,653,681 | | 4/1972 | Virtue ................................. 280/642 |
| 4,116,465 | * | 9/1978 | Maclaren ............................ 280/647 |
| 4,506,907 | * | 3/1985 | Miyagi ................................ 280/642 |
| 4,529,219 | * | 7/1985 | Shamie ............................... 280/642 |
| 4,575,896 | | 3/1986 | Nakano et al. ..................... 16/35 R |
| 4,608,729 | * | 9/1986 | Huang ................................. 16/35 R |
| 4,610,460 | * | 9/1986 | Kassai ................................ 280/650 |
| 4,620,711 | * | 11/1986 | Dick ................................... 280/30 |
| 4,779,879 | * | 10/1988 | Kassai ............................. 280/47.36 |
| 4,831,689 | * | 5/1989 | Lo ....................................... 16/35 R |
| 4,844,504 | * | 7/1989 | Bigo ................................... 280/642 |
| 5,125,676 | * | 6/1992 | Teng ............................... 280/47.36 |
| 5,181,735 | * | 1/1993 | Onishi ................................ 280/642 |
| 5,388,852 | * | 2/1995 | Bigo et al. ......................... 280/642 |
| 5,590,896 | * | 1/1997 | Eichhorn ............................ 280/642 |
| 5,988,670 | * | 11/1999 | Song et al. ......................... 280/648 |

FOREIGN PATENT DOCUMENTS

| 811318 | 6/1951 | (DE) . |
| 38-11533 | 6/1963 | (JP) . |
| 48-5797 | 2/1973 | (JP) . |
| 54-87558 | 6/1979 | (JP) . |

OTHER PUBLICATIONS

English language abstract of JP 54–87558.
English language abstract of JP 38–11533.
English language abstract of JP 48–5797.

* cited by examiner

Primary Examiner—Brian L. Johnson
Assistant Examiner—Bridget Avery
(74) Attorney, Agent, or Firm—Greenblum & Bernstein, P.L.C.

(57) ABSTRACT

A suspension for a vehicle includes an apron having a seat fixed thereon, a steering handle supporting member pivotally affixed to opposite sides of a rear portion of apron, a left front frame member and a right front frame member, each the front frame member having a front wheel installed to a front end thereof. A left rear frame member and a right rear frame member each have a rear wheel installed to a rear end thereof. A guard support, a left front link and a right front link are provided. Each front link is connected between a substantially middle portion of the front frame member and a lower end of the handle supporting piece. A left rear link and a right rear link, each connected between a substantially middle portion of the rear frame member and the pivoting point of the steering handle supporting member. A respective rear end of each front frame member, a respective front end of each rear frame member, and a lower end of the guard support are all pivotal about a common frame shaft which traverses the apron.

7 Claims, 4 Drawing Sheets

[Fig.1]
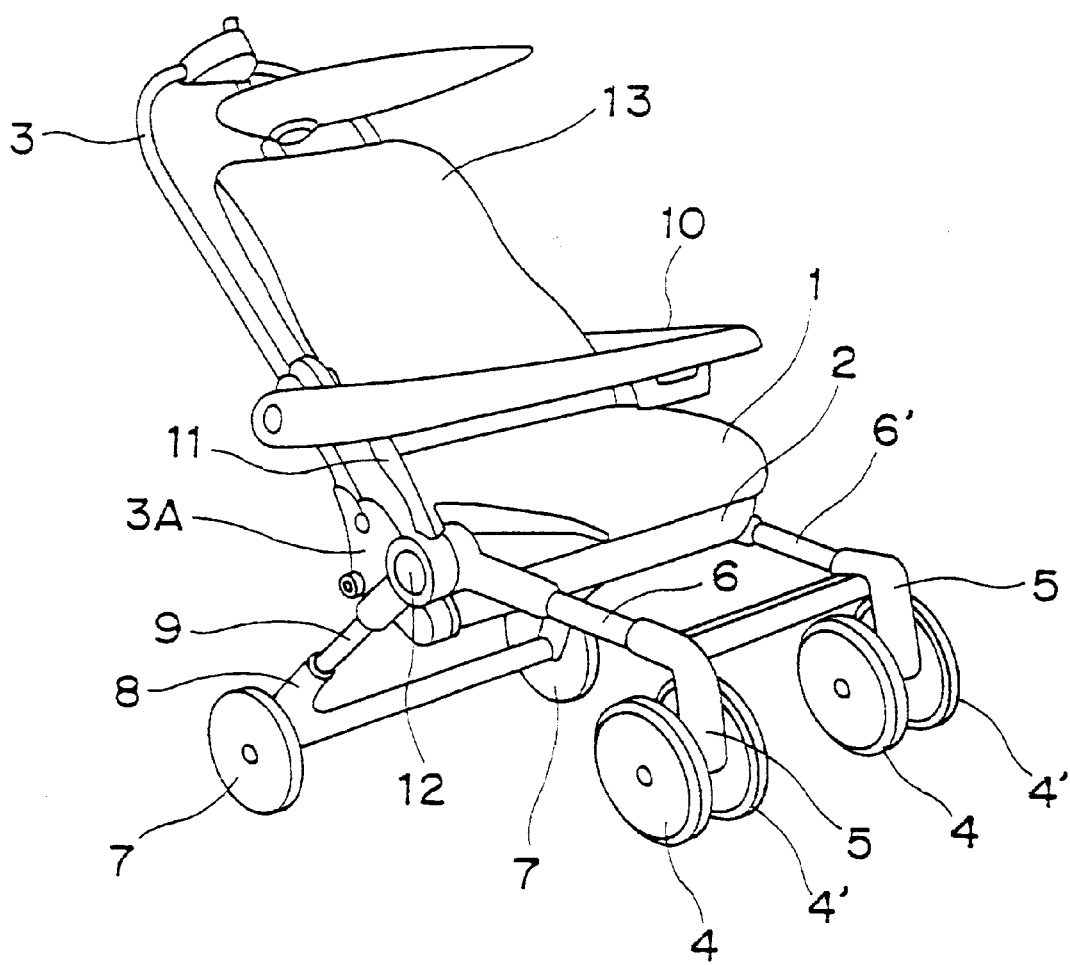

[Fig.2]
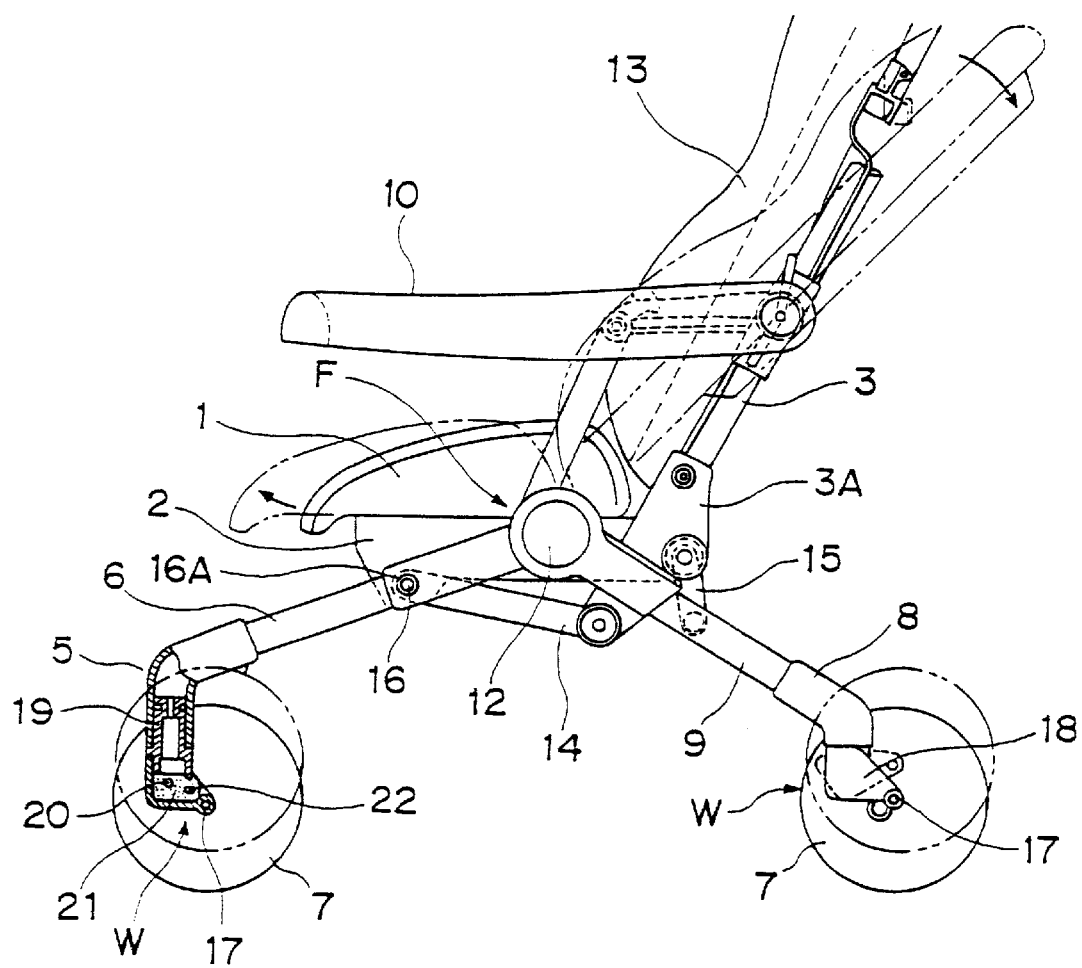

[Fig.3]
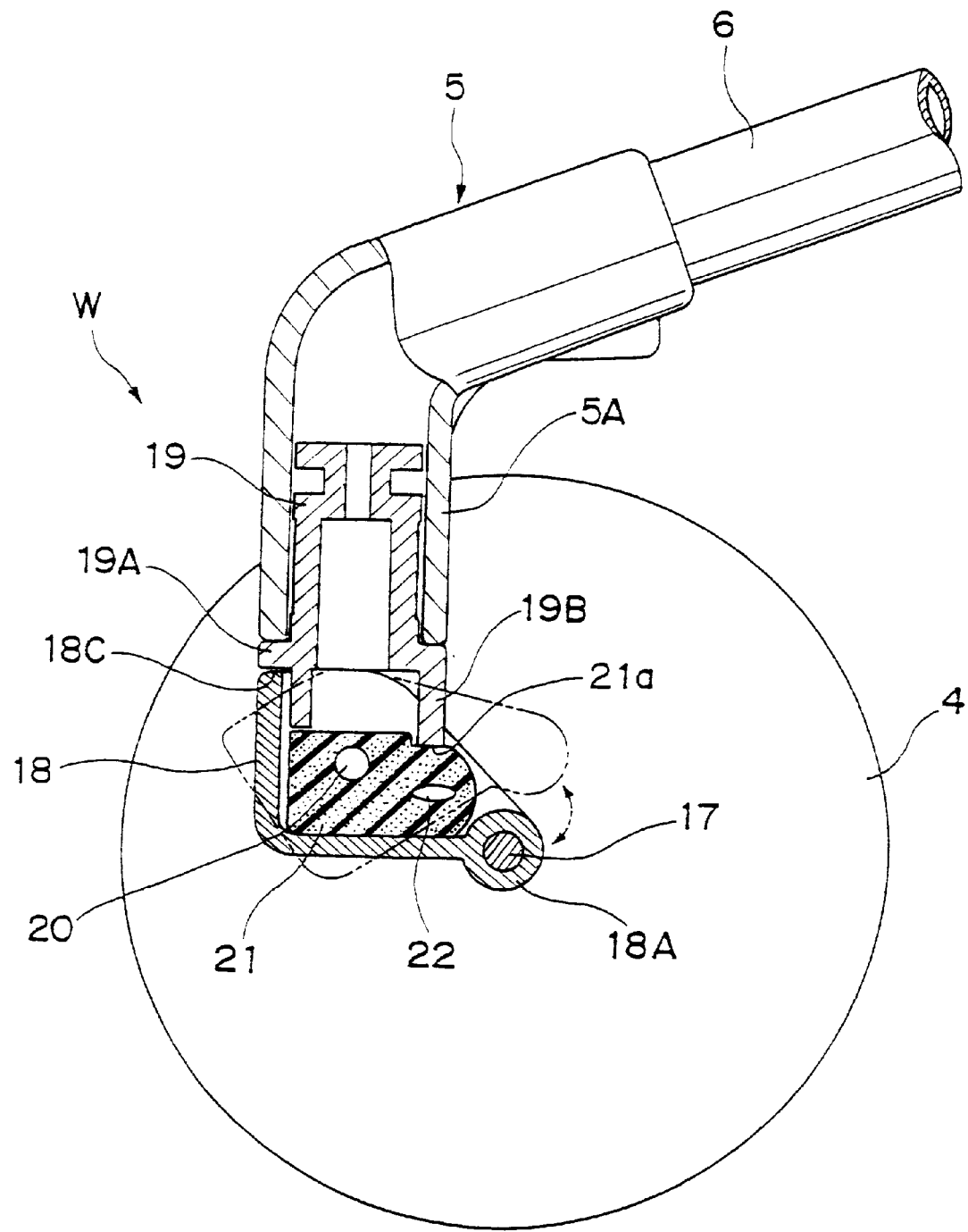

[Fig.4]
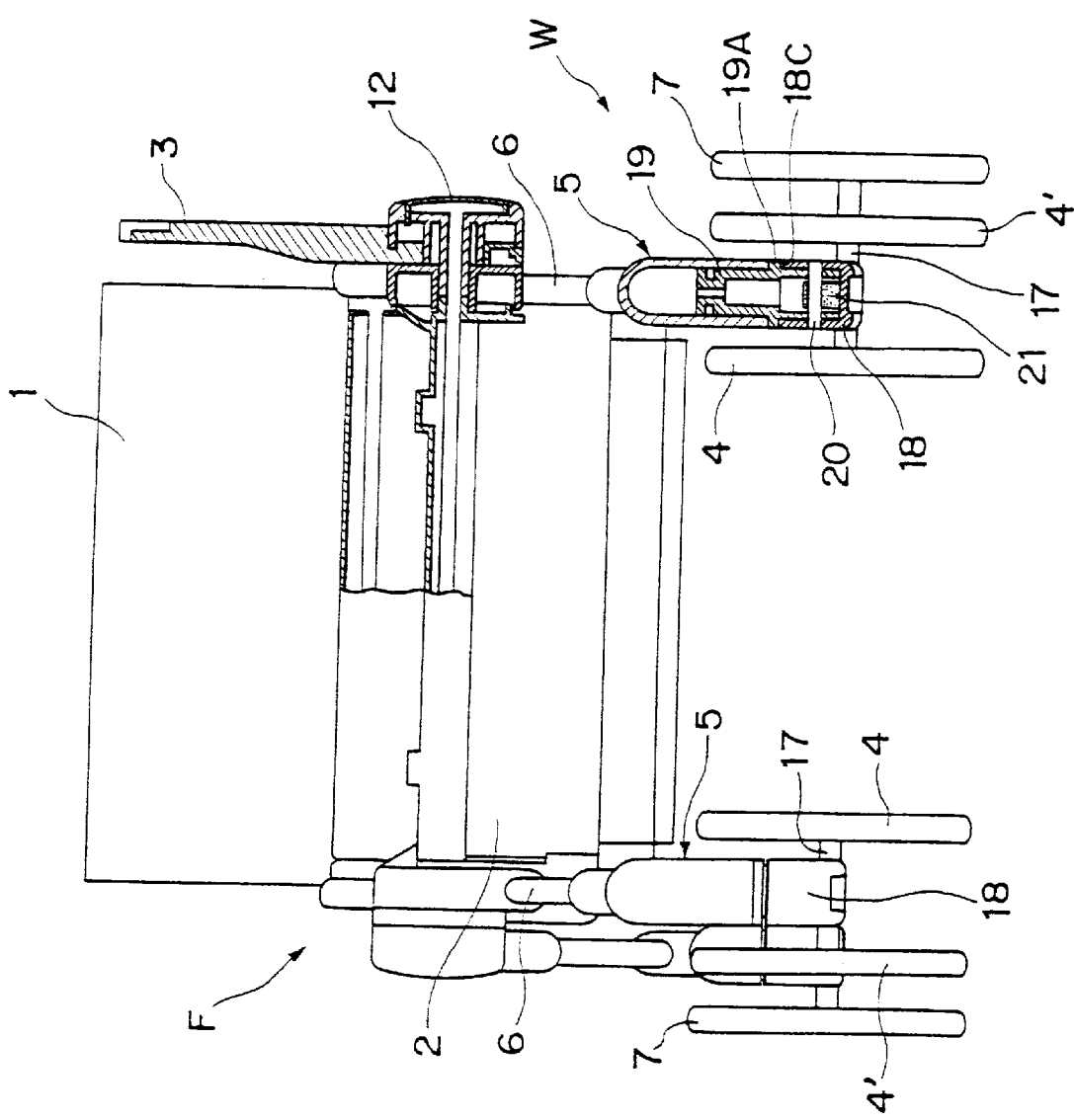

SUSPENSION FOR STROLLER

TECHNICAL FIELD

The present invention relates to a suspension for use in a foldable vehicle for babies or small children, or a stroller, used to carry a baby or small children thereon when going out for shopping, walk or travel, and more particularly to a suspension used in a stroller to effectively absorb, by a frame suspension mechanism and/or wheel suspension mechanism, shocks transmitted through the wheels from undulations, large or small, of the road surface when the stroller is moved on the road.

BACKGROUND ART

Many of the conventional suspensions used in strollers use a spring or the like interposed between the chassis and wheel of the stroller. In such conventional suspensions, the elasticity of the spring is utilized to absorb mainly shocks from irregularities or small undulations of the road surface when the stroller travels on the road.

However, all the road surfaces on which the stroller is used are not flat or have such small undulations or irregularities. Many roads are largely undulating, winding and bumpy. Some roads have steps. In addition, all indoor passages and ways are not free from steps, large or small. Namely, the conventional suspension mechanism to absorb only the shocks from small undulations or irregularities cannot enable the stroller to override or go over steps, so the stroller cannot be manipulated smoothly at an emergency. In these situations, a suspension mechanism has been demanded which is adapted to assure a stable travel of a stroller on road surface undulations, large or small, namely, to effectively absorb shocks transmitted through the wheels from bumpy road surfaces or steps.

Accordingly, the present invention has an object to overcome the drawbacks of the prior art by providing a stroller suspension which is adapted to assure a comfortable, stable travel of the stroller even on a bumpy or stepped road surface.

The present invention has an another object to provide a stroller provided with a shock absorbing device (frame suspension mechanism) to effectively absorb shocks from large road surface undulations.

The present invention has a still another object to provide a stroller provided with a shock absorbing device (wheel suspension mechanism) to effectively absorb shocks from small road surface undulations.

DISCLOSURE OF THE INVENTION

The above object can be attained by providing a suspension used in a stroller comprising an apron having a seat fixed thereon, a steering handle supporting piece pivoted to either rear lateral portion thereof, a pair of front frame members, right and left, each having a front wheel installed to a front end thereof via a wheel holder, a pair of rear frame members, right and left, each having a rear wheel installed to a read end thereof via a wheel holder, and guard support for a safety guard, the suspension having a frame suspension mechanism constructed as follows:

the rear end of the front frame member, front end of the rear frame member and the lower end of the guard support being pivotally connected together to a frame shaft traversed through the apron;

each of a pair of front links, right and left, being connected between a nearly middle portion of the front frame member and lower end of the handle supporting piece;

a pair of pair of rear links, right and left, being connected between a nearly middle portion of the rear frame member and the pivot of the handle supporting piece.

Also the above object can be attained by providing a suspension used in a stroller comprising an apron having a seat fixed thereon, a steering handle supporting piece pivoted to either rear lateral portion thereof, a pair of front frame members, right and left, each having a front wheel installed to a front end thereof via a wheel holder, a pair of rear frame members, right and left, each having a rear wheel installed to a read end thereof via a wheel holder, and guard support for a safety guard, the rear end of the front frame member, front end of the rear frame member and th lower end of the guard support being pivotally connected together to a frame shaft traversed through the apron, the suspension having a wheel suspension mechanism provided in the wheel holder installed to the lower end of each of the front and read frame members and which comprises:

a bearing support member having a flange formed at a front lower portion thereof and a leg portion formed at a rear lower portion thereof; and a bearing member pivoted to a lower portion of the bearing support member to be rockable vertically about the pivot and housing a rubber bush block therein;

the bearing member having born in a rear portion thereof a wheel shaft on which a wheel is supported.

The above object can also be attained by providing a suspension for a stroller comprising an apron having a seat fixed thereon, a steering handle supporting piece pivoted to either rear lateral portion thereof, a pair of front frame members, right and left, each having a front wheel installed to a front end thereof via a wheel holder, a pair of rear frame members, right and left, each having a rear wheel installed to a rear end thereof via a wheel holder, and guard support for a safety guard, the suspension comprising:

a frame suspension mechanism constructed as follows:

the rear end of the front frame member, front end of the rear frame member and the lower end of the guard support being pivotally connected together to a frame shaft traversed through the apron; each of a pair of front links, right and left, being connected between a nearly middle portion of the front frame member and lower end of the handle supporting piece;

a pair of pair of rear links, right and left, being connected between a nearly middle portion of the rear frame member and the pivot of the handle supporting piece, and a wheel suspension mechanism provided in the wheel holder installed to the lower end of each of the front and read frame members and which comprises:

a bearing support member having a flange formed at a front lower portion thereof and a leg portion formed at a rear lower portion thereof; and a bearing member pivoted to a lower portion of the bearing support member to be rockable vertically about the pivot and housing a rubber bush block therein;

the bearing member having born in a rear portion thereof a wheel shaft on which a wheel is supported.

BRIEF DESCRIPTION OF THE DRAWINGS

FIG. 1 is a perspective view of a whole stroller;

FIG. 2 is a side elevation of the stroller in FIG. 1, showing a wheel suspension mechanism according to the present invention in the form of a cutaway sectional view;

FIG. 3 is a sectional view, enlarged in scale, of the wheel suspension mechanism in FIG. 2; and FIG. 4 is a front view of the stroller in FIG. 1, showing the wheel suspension mechanism and a frame suspension mechanism in the form of a cutaway sectional view.

BEST MODE FOR CARRYING OUT THE INVENTION

The best modes of carrying out the present invention will be discussed in detail with reference to the accompanying drawings. The stroller suspension for a stroller according to the present invention comprises mechanical members, not air or oil, to suppress shocks from the road surface when the stroller is moved on the road. It uses, singly or in combination, a frame suspension mechanism F adapted to effectively absorb shocks from large undulations (irregularities) of the road surface and a wheel suspension mechanism W adapted to effectively absorb shocks from small undulations (irregularities) of the road surface.

Briefly, the frame suspension mechanism F comprises a front frame and rear frame pivotally connected to either side of an apron and linked to each other with a front link and rear link. The front and rear frames are independently suspended on either side of the frame pivot at which they are joined to each other. The flexibility of these frames and linkage of them will absorb shocks from large road surface undulations. The front and rear links supplement the independent suspension of the front and rear frames and also suppress shocks transmitted through the wheels from the road surface.

The frame suspension mechanism F has a hard suspension structure and a linkage which rocks at a long stroke. Therefore, it can effectively absorb and reduce shocks from large road surface undulations during travel of the stroller. The frame suspension mechanism F can sufficiently absorb shocks transmitted to the stroller being moved on a bumpy or stepped road, thus assuring a comfortable, stable travel of the stroller.

On the other hand, the wheel suspension mechanism W is adapted to effectively absorb small road surface undulations and vibrations transmitted directly from the road surface. It is characterized in the use of a rubber bush to absorb the shocks. The wheel suspension mechanism W utilizes the elasticity of the rubber bush to provide a soft suspension, and thus responds to a shock from the road surface at a short stroke. Thus, the wheel suspension mechanism W can effectively absorb shocks transmitted to the stroller chassis through the wheels from the bumpy or irregular road surface during travel on the road.

The present invention adopts the aforementioned frame and wheel suspension mechanisms F and W in combination to use the synergistic effect of both the mechanisms F and W in order to realize a stable, smooth travel of a stroller on all kinds of road surfaces such as sidewalk and passages and ways in parks, department stores, supermarkets, etc.

The suspension according to the present invention will be described herebelow in further detail with reference to the accompanying drawings:

There is illustrated a foldable vehicle for babies or small children, or a stroller made of a plastic or light metal, used to carry a baby or small children thereon when going out for shopping, walk or travel. As shown in FIGS. 1 and 2, the stroller comprises a seat 1 fixed on the top of an apron 2, and an arch-shaped steering handle 3. There is pivotally connected at rear lateral portions of the apron 2 a pair of steering handle supporting pieces 3A, right and left, fixed to lower ends, respectively, of the steering handle 3. Nearly at the middle of the lateral sides of the apron 2, there are pivotally connected to a frame shaft 12 a rear end of each of a pair of front frame members 6 and 6', right and left, having a front wheel 4 installed to a front end thereof via a front wheel holder 5, a front end of each of a pair of rear frame members 9, right and left, having a rear wheel 7 installed to a rear end thereof via a rear wheel holder 8, and a lower end of each of a pair of guard supports 11, right and left, supporting an arch-shaped safety guard 10. The stroller thus constructed may be assumed to consist of two equal, laterally symmetrical halves. Therefore, the stroller will be described herebelow concerning only one half of the stroller for the simplicity of explanation:

As shown, the stroller has aback rest 13 which can be reclined and folded in relation to the seat 1.

The frame suspension mechanism F comprises the front frame member 6, rear frame member 9, front link 14 and rear link 15 connected to each other to form a linkage. More specifically, the front frame member 6 and rear frame member 9 are pivotally connected at the rear and front ends thereof to the end of the frame shaft 12 traversing the apron 2, the lower end of the steering handle supporting pieces 3A pivotally connected to either rear lateral portion of the apron 2 and a nearly central portion of the front frame member 6 are connected to each other by the front link 14, and the pivot of the handle supporting piece 3A and a nearly central portion of the rear frame member 9 are connected to each other by the rear link 15.

A pin 16 is provided to pivotally connect the front frame member 6 and front link 14. The pin 16 is removably fitted in a recess 16A formed in the lower forward portion of the apron 2. Fitting the pin 16 in the recess 16A will lock the linkage consisting of the front and rear frame members 6 and 9 and front and rear links 14 and 15 as mentioned above to permit the stroller to travel as supported by the frame suspension mechanism F, while extracting the pin 16 from the recess 16A will permit the stroller to be folded. Therefore, with the pin 16 fitted in the recess 16A, the frame members 6 and 9, links 14 and 15 and the handle supporting piece 3A can be connected to each other to form a structure which can absorb and suppress vibrations and shocks transmitted to the frames 6 and 9.

A cushion member (not shown) may be provided around the pivot of the frame shaft 12 of the frame suspension mechanism F and between the front and rear frame members 6 and 9 to facilitate pivoting of the frame members 6 and 9. In this embodiment, the wheel suspension mechanism W that will be described below may further be provided in the stroller to absorb mainly shocks from small irregularities on the road surface. It should be noted, however, that the present invention is not limited by this use of both the frame and wheel suspension mechanisms F and W, but either the frame suspension mechanism F or wheel suspension mechanism W may of course be employed singly in the stroller.

The wheel suspension mechanism W, one of the characteristics of the present invention, will be described herebelow:

The front and rear frame members 6 and 9 have the front wheel 4 and rear wheel 7 installed at the rear and front ends thereof, respectively, by means of the front and rear wheel holders 5 and 8, respectively. The wheel suspension mechanism F according to the present invention is provided in and under each of the wheel holders 5 and 8, and designed to effectively absorb vibrations of a short stroke given directly to each wheel from the road surface.

The wheel suspension mechanism W provided in the front wheel holder 5 is quite similar to that provided in the rear wheel holder 8. Hence, the wheel suspension mechanism W will be described below concerning a one provided in the front wheel holder 5, and the wheel suspension mechanism W for the rear wheels will not be described herein. As shown in FIGS. 3 and 4, two front wheels 4 and 41 are used in pair and born rotatably at the lower end of the wheel holder 5. The wheel suspension mechanism W absorbs and suppresses shocks such as vertical vibration and rocking applied to the front frame. The wheel holder 5 has a lower tubular portion 5A which is open at the lower end thereof. A cylindrical bearing support member 19 is fitted in the lower tubular portion SA to be rotatable 360 deg. about the axis thereof. The cylindrical bearing support member 19 has installed at the lower end thereof a bearing member 18 having an L-shaped box-like section and which is rockable vertically about a pivot 20. As shown, the bearing member 18 includes a bearing 18A which supports therein a wheel shaft 17 on which the front wheels 4 and 4' are born rotatably.

As mentioned above, the bearing member 18 is born at the lower end of the bearing support member 19 to be rockable vertically about the pivot 20. When the bearing member 18 is rocked about the pivot 20, an upper edge 18C of the bearing member 18 abuts a front flange 1.9A formed at a lower portion of the bearing support member 19 to thus limit the bearing member 18 from rocking further upward.

The bearing support member 19 abuts at the lower end thereof to the top, more specifically, to a rear stepped portion 21*a*, of a rubber bush 21 provided inside the bearing member 18. Therefore, when the bearing member 18 rocks upward along with the front wheels 4 and 4', the rubber bush 21 is compressed by the bearing member 18. The compression is absorbed by the rubber bush 21 to suppress a vibration and shock transmitted to the wheels 4 and 41 from the road surface.

To prevent the rubber bush 21 from being crushed by the weight of the stroller, applied to the bearing support member 19, the rubber bush 21 has more than one generally elliptic venthole 22 formed in, more specifically, in a rear portion 21*a* thereof.

The wheel suspension mechanism W for the front wheels 4 and 4' has been described in the foregoing. Since the wheel suspension mechanism W provided in the rear wheel holder 8 is quite similar to that provided in the front wheel holder 5. Hence the wheel suspension mechanism W for the rear wheels 7 will not be described herein.

Industrial Applicability

As having been described in the foregoing, the stroller suspension according to the present invention, adopts the frame suspension mechanism F to effectively absorb and suppress hard vibrations of long stroke transmitted to the stroller chassis through the wheels from large undulations of the road surface as the stroller is moved, and the wheel suspension mechanism W to effectively absorb and suppress soft vibrations of short stroke transmitted to the stroller chassis through the wheels from small undulations of the road surface. Thus, the stroller suspension according to the present invention can assure a stable travel of the stroller on bumpy and stepped road surfaces.

Adoption of both the frame and wheel suspension mechanisms permits to absorb and suppress more effectively shocks from the road surface, thereby assuring a stable, smooth travel of a stroller on all kinds of road surfaces such as sidewalk and passages and ways in parks, department stores, supermarkets, etc.

The present invention is not applicable only to strollers but also to other similar small vehicles such as walkers or walking aids used in hospitals, wheelchairs.

What is claimed is:

1. A suspension for a vehicle, comprising:

an apron;

a steering handle supporting member pivotally affixed to opposite sides of a rear portion of said apron;

a left front frame member and a right front frame member, each said front frame member having a front wheel affixed to a front end thereof;

a left rear frame member and a right rear frame member, each said rear frame member having a rear wheel affixed to a rear end thereof;

a guard support;

a left front link and a right front link, each said front link being connected between a substantially middle portion of said front frame member and a lower end of said steering handle supporting member;

a left rear link and a right rear link, each said rear link being connected between a substantially middle portion of said rear frame member and a pivoting point of said steering handle supporting member;

wherein a respective rear end of each said front frame member, a respective front end of each said rear frame member, and a lower end of said guard support are all pivotal about a common frame shaft, said frame shaft traversing said apron.

2. The suspension as set forth in claim 1, further comprising a seat affixed to said apron.

3. A suspension for a vehicle, comprising:

an apron;

a steering handle supporting member pivotally affixed to opposite sides of a rear portion of said apron;

a left front frame member and a right front frame member, each said front frame member having a front wheel affixed to a front end thereof via a wheel holder;

a left rear frame member and a right rear frame member, each said rear frame member having a rear wheel affixed to a rear end thereof via a wheel holder;

a guard support; and a wheel suspension mechanism provided at each said wheel holder and affixed to at least one of a lower end of said left and right front frame members and a lower end of said left and right rear frame members, said wheel suspension mechanism comprising:

a bearing support member having a flange formed at a front lower portion thereof and a leg portion formed at a rear lower portion thereof; and a bearing member pivotally connected to a lower portion of said bearing support member and rockable vertically about a pivot of said bearing member, said bearing member housing a rubber bush block therein;

wherein said bearing member bears a wheel shaft on which a wheel is supported, in a rear portion of said bearing member; and wherein a respective rear end of each said front frame member, a respective front end of each said rear frame member, and a lower end of said guard support are all pivotal about a common frame shaft, said frame shaft traversing said apron.

4. The suspension as set forth in claim 3, wherein more than one venthole is formed in said rubber bush.

5. The suspension as set forth in claim 3, further comprising a seat affixed to said apron.

6. A suspension for a vehicle, comprising:

an apron;

a steering handle supporting member pivotally affixed to opposite sides of a rear portion of said apron;

a left front frame member and a right front frame member, each said front frame member having a front wheel affixed to a front end thereof;

a left rear frame member and a right rear frame member, each said rear frame member having a rear wheel affixed to a rear end thereof;

guard support;

a left front link and a right front link, each said front link being connected between a substantially middle portion of said front frame member and a lower end of said handle supporting member;

a left rear link and a right rear link, each said rear link being connected between a substantially middle portion of said rear frame member and a pivoting point of said steering handle supporting member;

a wheel suspension mechanism provided at each said wheel holder and affixed to at least one of a lower end of said left and right front frame members and a lower end of said left and right rear frame members, said wheel suspension mechanism comprising:

a bearing support member having a flange formed at a front lower portion thereof and a leg portion formed at a rear lower portion thereof; and a bearing member pivotally connected to a lower portion of the bearing support member and rockable vertically about the pivot of said bearing member, said bearing member housing a rubber bush block therein;

wherein said bearing member bears a wheel shaft on which a wheel is supported, in a rear portion of said bearing member; and wherein a respective rear end of each said front frame member, a respective front end of each said rear frame member, and a lower end of said guard support are all pivotal about a common frame shaft, said frame shaft traversing said apron.

7. The suspension as set forth in claim 6, further comprising a seat affixed to said apron.

* * * * *

UNITED STATES PATENT AND TRADEMARK OFFICE
CERTIFICATE OF CORRECTION

PATENT NO.    : 6,203,054 B1
DATED         : March 20, 2001
INVENTOR(S)   : T. Matsumoto It is certified that error appears in the above-identified patent and that said Letters Patent is hereby corrected as shown below:

<u>Column 7, claim 6,</u>
Line 11, of the printed patent, before "guard" insert -- a --.

Signed and Sealed this

Twenty-sixth Day of February, 2002

Attest:

Attesting Officer

JAMES E. ROGAN
*Director of the United States Patent and Trademark Office*